United States Patent
Park

(10) Patent No.: US 11,930,146 B2
(45) Date of Patent: Mar. 12, 2024

(54) ELECTRONIC DEVICE AND OPERATION METHOD THEREOF, AND SERVER AND OPERATION METHOD THEREOF IN SYSTEM FOR PROVIDING LOCATION-BASED SERVICE BASED ON OBJECT DETECTED FROM VIDEO

(71) Applicant: THINKWARE CORPORATION, Seongnam-si (KR)

(72) Inventor: Chan Soo Park, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 17/843,058

(22) Filed: Jun. 17, 2022

(65) Prior Publication Data

US 2022/0321726 A1 Oct. 6, 2022

Related U.S. Application Data

(63) Continuation of application No. 16/722,903, filed on Dec. 20, 2019, now Pat. No. 11,394,848.

(30) Foreign Application Priority Data

Dec. 24, 2018 (KR) .................... 10-2018-0168776
Nov. 20, 2019 (KR) .................... 10-2019-0149354

(51) Int. Cl.
*H04N 1/32* (2006.01)
*G06K 7/14* (2006.01)
*G06K 19/06* (2006.01)
*H04W 4/029* (2018.01)

(52) U.S. Cl.
CPC ....... *H04N 1/32144* (2013.01); *G06K 7/1417* (2013.01); *G06K 19/06037* (2013.01); *H04W 4/029* (2018.02); *G06K 2019/06262* (2013.01)

(58) Field of Classification Search
CPC .......... G06K 7/1417; G06K 19/06037; G06K 2019/06262; H04W 4/029; H04N 1/32144
See application file for complete search history.

(56) References Cited

U.S. PATENT DOCUMENTS

| 2008/0147730 | A1 | 6/2008 | Lee et al. |
| 2010/0034468 | A1 | 2/2010 | Boncyk et al. |
| 2012/0062395 | A1* | 3/2012 | Sonnabend .......... G08G 1/0112 340/932.2 |
| 2012/0242842 | A1 | 9/2012 | Yoshigahara et al. |
| 2013/0113827 | A1 | 5/2013 | Forutanpour et al. |
| 2013/0272574 | A1 | 10/2013 | Cohen |
| 2019/0122553 | A1* | 4/2019 | Sakuma ............... G06V 20/586 |
| 2019/0204840 | A1* | 7/2019 | Park ................... G01C 21/3667 |

* cited by examiner

*Primary Examiner* — Laura A Gudorf
(74) *Attorney, Agent, or Firm* — WHDA, LLP

(57) ABSTRACT

In a system in which a first electronic device, a server, and a second electronic device wirelessly communicate with each other, the first electronic device may detect object information associated with at least one object from a video being captured and may transmit the object information to the server, the server may identify a location of the object based on the object information and may transmit service information associated with the location of the object to the second electronic device, and the second electronic device may provide the service information to a user.

16 Claims, 14 Drawing Sheets

ELECTRONIC DEVICE AND OPERATION METHOD THEREOF, AND SERVER AND OPERATION METHOD THEREOF IN SYSTEM FOR PROVIDING LOCATION-BASED SERVICE BASED ON OBJECT DETECTED FROM VIDEO

CROSS-REFERENCE TO RELATED APPLICATION

This application is a continuation of U.S. application Ser. No. 16/722,903, filed on Dec. 20, 2019, which claims the priority benefit of Korean Patent Application Nos. 10-2018-0168776, filed on Dec. 24, 2018 and 10-2019-0149354, filed on Nov. 20, 2019, in the Korean Intellectual Property Office, the disclosure of which is incorporated herein by reference.

BACKGROUND

1. Field of the Invention

The following description of example embodiments relates to an electronic device and an operation method of the electronic device, and a server and an operation method of the server in a system for providing a location-based service based on an object detected from a video.

2. Description of the Related Art

In general, an electronic device performs various functions in a compositive manner and provides a variety of services. For example, the electronic device provides a location-based service (LBS). For example, the electronic device may measure a current location and may guide a travel route from the current location to a destination. As another example, the electronic device may download service information associated with a location designated by a user and may provide the service information to the user.

However, the electronic device as above simply provides a location-based service based on an input from the user. For example, the electronic device may directly measure a current location, or the user of the electronic device may directly input a desired location and, in response thereto, the electronic device may search for service information through a server. Accordingly, the user of the electronic device may experience inconveniences in using the location-based service.

SUMMARY

According to an aspect of example embodiments, there is provided an electronic device including a camera module configured to capture a video; a communication module configured to wirelessly communicate with a server; and a processor configured to connect to the camera module and the communication module. The processor is configured to detect object information associated with at least one object present in the video being captured, and to transmit the object information to the server.

According to an aspect of example embodiments, there is provided an operation method of an electronic device, the method including capturing a video; detecting object information associated with at least one object present in the video being captured; and wirelessly transmitting the object information to a server.

According to an aspect of example embodiments, there is provided a server including a communication module configured to wirelessly communicate with at least one electronic device; and a processor configured to operatively connect to the communication module. The processor is configured to receive object information associated with at least one object through the communication module, to identify a location of the object based on the object information, and to transmit service information associated with the location through the communication module.

According to an aspect of at least one example embodiment, there is provided an operation method of a server, the method including receiving object information associated with at least one object from a first electronic device; identifying a location of the object based on the object information; and transmitting service information associated with the location to a second electronic device.

According to an aspect of at least one example embodiment, there is provided an operation method of an electronic device, the method including wirelessly receiving, from a server, service information associated with a location of an object that is determined based on at least one object; and providing the service information based on a preinstalled application.

According to some example embodiments, a server may provide an appropriate location-based service for a user without a user input to an electronic device. That is, the server may verify a user location based on an object detected while capturing a video. Accordingly, the electronic device does not need a separate input from the user and does not need to verify the user location. Also, since the server determines service information based on the user location, the user may use appropriate service information to fit a time and a place corresponding to a current location. Therefore, the user may efficiently use a location-based service.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
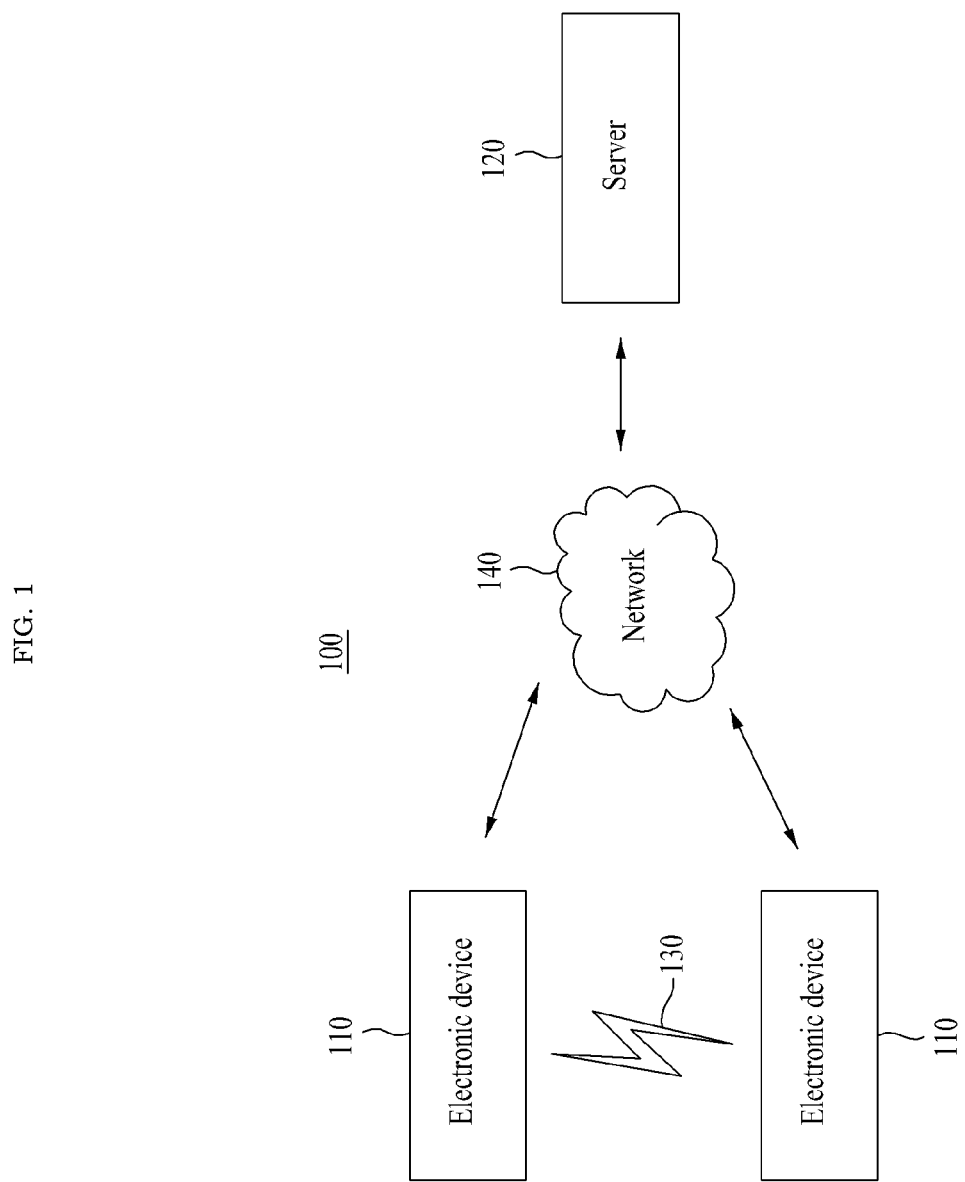
FIG. 1 is a diagram illustrating a system according to example embodiments.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments.

Hereinafter, example embodiments will be described with reference to the accompanying drawings.

The example embodiments and the terms used herein are not construed to limit the disclosure to specific example embodiments and may be understood to include various modifications, equivalents, and/or substitutions. Like reference numerals refer to like elements throughout. The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof. Herein, the expressions, "A or B," "at least one of A and/or B," "A, B, or C," "at least one of A, B, and/or C," and the like may include any possible combinations of listed items. Terms "first," "second," "third," etc., are used to describe various components and the components should not be limited by the terms. The terms are simply used to distinguish one component from another component. For example, a first component may be named as a second component without deviating from the scope of the present invention. When a component, for example, a first component, is described to be "(functionally or communicatively) connected to" or "accessed to" another component, for example, a second component, the component may be directly connected to the other component or may be connected through still another component, for example, a third component. In contrast, when an element is referred to as being "directly connected to" or "directly coupled to" another element or layer, there are no intervening elements or layers present.

The term "module" used herein may include a unit configured as hardware, software, or firmware, and may be interchangeably used with the terms "logic," "logic block," "part," "circuit," etc. The module may be an integrally configured part, a minimum unit that performs at least function, or a portion thereof. For example, the module may be configured as an application-specific integrated circuit (ASIC).

FIG. 1 is a diagram illustrating a system according to example embodiments.

Referring to FIG. 1, a system 100 according to example embodiments may include at least one electronic device 110 and a server 120. The electronic device 110 may communicate with at least one of another electronic device 110 and the server 120 through at least one of a first network 130 and a second network 140. For example, the first network 130 may support short-range wireless communication and the second network 140 may support far distance wireless communication. According to an example embodiment, the electronic device 110 may communicate with the other electronic device 110 through the server 120. The electronic device 110 may refer to various types of devices. For example, the electronic device 110 may include at least one of a user terminal such as a portable communication device (e.g., a smartphone), an imaging acquiring device such as a dashboard camera, a computer device, a portable multimedia device, a portable medical device, a camera, a wearable device, a point of sales terminal, and an electronic device.

Figure 2A:
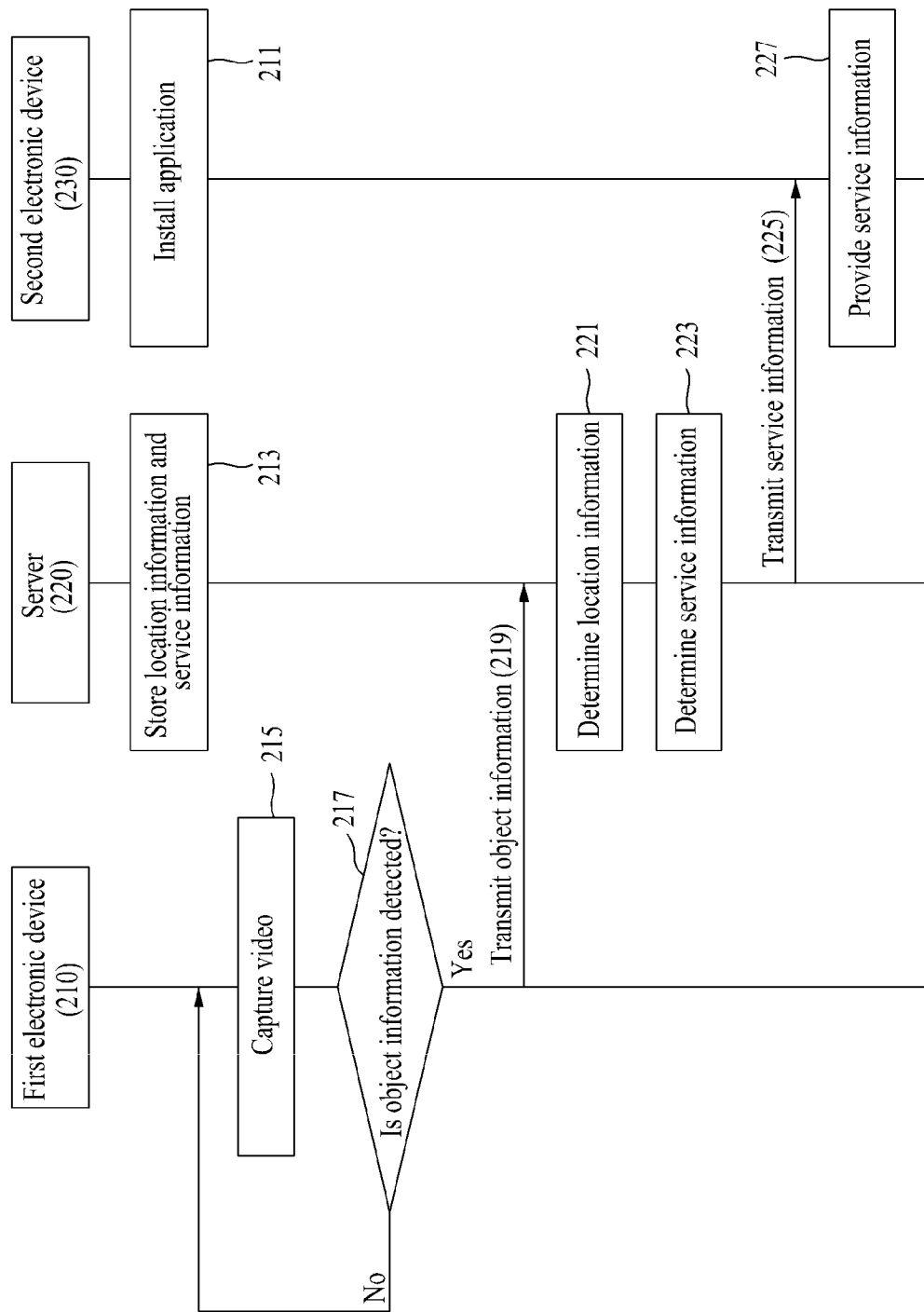
FIG. 2A illustrates a signal flow in a system according to example embodiments.

FIG. 2A illustrates a signal flow in a system according to example embodiments. Referring to FIG. 2A, a system (e.g., the system 100 of FIG. 1) according to example embodiments may include a first electronic device 210 (e.g., the electronic device 110 of FIG. 1), a server 220 (e.g., the server 120 of FIG. 1), and a second electronic device 230 (e.g., the electronic device 110 of FIG. 1). According to an example embodiment, the first electronic device 210 may be configured to be identical to the second electronic device 230. According to another example embodiment, the first electronic device 210 may be configured to be different from the second electronic device 230. For example, the first electronic device 210 may be a black box mounted to a vehicle or a vehicle-to-machine (V2M) enabled communication module that is installed in the vehicle, and the second electronic device 230 may be a user terminal carried by a user, a computer device, or a point of sale (POS) terminal.

In operation 211, the second electronic device 230 may install a predetermined application. For example, the application may be associated with a location-based service. The second electronic device 230 may download and install the application from an application store.

In operation 213, the server 220 may store location information and service information. The location information may represent information associated with at least one location at which at least one object is provided. The object may be formed in various types. A type of the object may vary based on a location at which the object is provided. The object may be provided on, for example, a wall surface of a building, a signboard, a display board, a large sticker, a banner, or may be provided in a hologram form at an entrance of a parking lot. The type of the object may include at least one of a barcode, a quick response (QS) code, an image, a text, and a color. Each object and a corresponding location may be mutually mapped and stored in the location information. The location information may include object information about each object and location identification information about each location. According to an example embodiment, when providing an object at a predetermined location, the server 220 may store location information of the object to correspond to the location. The service information may represent information associated with a service available at one or more locations at which the at least one object is provided. For example, the service information may include at least one of guide information about at least one area corresponding to each location, advertising information, event information such as a coupon, payment information, and user related information including a visit frequency, a visit time (e.g., a season, a date, and a point in time), a stay time, contact information, and vehicle information (e.g., a vehicle type, a vehicle model, and a vehicle number). Through this, the server 220 may conduct a business for selling goods or providing services for a specific company under contract with the company based on the service information and may earn revenues from the business. According to example embodiments, the server 220 may generate and store service information based on data input from an operator of the server 220, or may define and store the service information through another server, for example, the server 120 of FIG. 1.

In operation 215, the first electronic device 210 may capture a video. According to an example embodiment, when the first electronic device 210 is ON, the first electronic device 210 may continuously capture the video. For example, when the first electronic device 210 is mounted to a vehicle, the first electronic device 210 may continuously or periodically collect state information associated with the vehicle, with continuously capturing the video. The state information may include, for example, at least one of a current location, a refuel amount, a battery state, and an engine oil state of the vehicle. Here, the first electronic device 210 may capture the video regardless of an operation state of the vehicle, for example, whether the vehicle is parked. According to another example embodiment, when the first electronic device 210 is ON, the first electronic device 210 may capture the video temporarily or during a period of time designated by the user in response to a request from the user.

In operation 217, the first electronic device 210 may detect object information from the video being captured. When the video being captured includes at least one object, the first electronic device 210 may detect object information from the video being captured. For example, the first electronic device 210 may analyze the video being captured based on a frame unit. As one example, the first electronic device 210 may analyze all of the frames of the video being captured. As another example, the first electronic device 210 may analyze frames spaced apart at predetermined intervals from among all of the frames of the video being captured. Through this, the first electronic device 210 may recognize an object from at least one of continuous frames and may detect the object information. In operation 219, the first electronic device 210 may transmit the object information to the server 220. In some example embodiments, when the same object information is iteratively detected a predetermined number of times, the first electronic device 210 may transmit the object information to the server 220.

In operation 221, the server 220 may determine location information based on the object information received from the first electronic device 210. The server 220 may identify a location at which the object corresponding to the object information is provided based on the object information. In some example embodiments, the server 220 may manage statistical data, for example, a number of visits, a preference, and a utilization status of an area corresponding to each location based on a number of times the location information is determined. In operation 223, the server 220 may determine service information based on the location information. That is the server 220 may determine the service information to be transmitted to the second electronic device 230.

In an example embodiment, the server 220 may identify object information based on a location at which an object is provided. For example, when an object is provided at an entrance of a gas station, object information may include refuel information. When the object is provided at an entrance of a store, the object information may include items on sales and coupon information. Also, when the object is provided in a maintenance shop, the object information may include an item to be maintained, a maintenance manual, software version information and update information of an operating system (OS), and the like, with respect to a vehicle to which the first electronic device 210 is mounted. When the object is provided in a parking object, the object information may include information, such as a parking fee, a parking lot operation time, and the like. Also, a location of each object may be mapped to information uniquely allocated to each corresponding object. The server 220 may determine service information associated with the location corresponding to the location information.

In another example embodiment, when an object is provided in a maintenance shop or an access point (AP) that provides high-speed wireless communication, for example, 4G/5G-based cellular or wireless fidelity (WiFi), object information may include information (software version information, error information, and information regarding whether update is required) used to install or update software of a vehicle to which the first electronic device 210 is mounted, or information used to diagnose defect of software of the vehicle to inspect a safety of the vehicle to which the first electronic device 210 is mounted. In the example embodiments, the server 220 may verify a location of the vehicle with respect to which a software install, software update, and safety inspection procedure is to be performed based on location information of the object, and may perform the software install, software update, and safety inspection of the vehicle or the first electronic device 210 through over the air (OTA) based on the verified location. When the software install, software update, and safety inspection of the vehicle or the first electronic device 210 is performed at a cost, payment information regarding the performed software install, software update, and safety inspection may be determined as the service information with respect to the second electronic device 230.

In another example embodiment, when an object is provided in a warehouse or a delivery destination of goods, object information may include transportation information, delivery information (delivery completion information, delivery location information, and the like), and the like. The object information may vary depending on whether the second electronic device 230 is a computer of a logistics management system or an electronic device carried by a recipient. In detail, when the second electronic device 230 is the computer of the logistics management system, the first electronic device 210 may be mounted to a transportation device, for example, a truck, which delivers the goods. In this case, the object information may include information regarding an arrival of the goods to a destination of the goods, which is to be transmitted to the server 220 of a logistics system. Service information to be transmitted from the server 220 to the second electronic device 230 in operation 225 may include payment information about a transportation fee to be charged to the recipient that receives the corresponding goods, payment information about a shipping charge to be paid to the first electronic device 210 mounted to the transportation device that delivers the corresponding goods to a location of the object, or logistics information to be notified to an operation server of the transportation device. On the contrary, when the second electronic device 230 is the electronic device of the recipient, the service information to be transmitted from the server 220 to the second electronic device 230 may include payment information about a transportation fee, an arrival completion of the goods, and an arrival time of the goods.

In operation 225, the server 220 may transmit the service information to the second electronic device 230. Here, the service information transmitted from the server 220 to the second electronic device 230 in operation 225 may be service information associated with at least one object acquired by the first electronic device 210. The server 220 may detect the second electronic device 230 set to correspond to the first electronic device 210 and may transmit the service information to the second electronic device 230. In some example embodiments, the server 220 may transmit the service information to another server, for example, the server 120 of FIG. 1, such that the other server, for example, the server 120 of FIG. 1, may transmit the service information to the second electronic device 230.

The second electronic device 230 set to correspond to the first electronic device 210 may refer to an electronic device that may receive service information associated with the object information acquired by the first electronic device 210. Here, the second electronic device 230 may be used by not only a user of the service information but also a provider of the service information.

Here, the second electronic device 230 may be an electronic device owned by the same user as the user of the first electronic device 210 and may be an electronic device owned by another user. When the second electronic device 230 is the electronic device owned by the same user as that of the first electronic device 210, the server 220 may determine that the second electronic device 230 and the first electronic device 210 are electronic devices owned by the same user through an authentication procedure performed when connecting to a communication network. When the first electronic device 210 and the second electronic device 230 are electronic devices owned by the same user, the server 220 transmits, to the second electronic device 230, service information corresponding to object information transmitted from the first electronic device 210.

In detail, when the user of the second electronic device 230 is identical to the user of the first electronic device 210, the server 220 may transmit guide information, advertising information, event information such as a coupon, payment information, and the like, to the second electronic device 230 as service information associated with the object information transmitted from the first electronic device 210. The user receiving the service information through the second electronic device 230 may perform an additional transaction based on a variety of information corresponding to the service information. In this case, the user of the second electronic device 230 may be a service user. For example, when service information received through the second electronic device 230 is guide information of facility in which the object information is located, indoor navigating may be driven such that the user may verify a location of a desired point based on the corresponding guide information. Also, when the service information received through the second electronic device 230 is payment information of a parking lot or a gas station in which the object information is located, the user may perform a transaction for a payment using the received payment information.

In contrast, when the user of the first electronic device 210 is different from the user of the second electronic device 230, the server 220 may detect, from among electronic devices accessed to a network, the second electronic device 230 capable of providing service information associated with the object information transmitted from the first electronic device 210, and may provide the service information associated with the object information to the detected second electronic device 230. In detail, the server 220 transmits, to the second electronic device 230 as the service information, user related information including a visit frequency, a visit time (e.g., a season, a date, and a point in time), a stay time, contact information, and vehicle information (e.g., a vehicle type, a vehicle model, and a vehicle number) of the user associated with the object information received from the first electronic device 210. In this case, the user of the second electronic device 230 may be a service provider, such as a shop owner.

In operation 227, the second electronic device 230 may provide the user with the service information received from the server 220. According to an example embodiment, the second electronic device 230 may provide the service information through a predetermined application. According to another example embodiment, when the service information is received from the server 220, the second electronic device 230 may generate a notification associated with the service information and may provide the service information through the application in response to a request from the user. For example, the second electronic device 230 may display a graphical user interface (GUI) associated with the service information. In some example embodiments, the second electronic device 230 may provide the service information through interaction with the server 220 or another server (e.g., the server 120 of FIG. 1) such as a payment server.

Figure 2B:
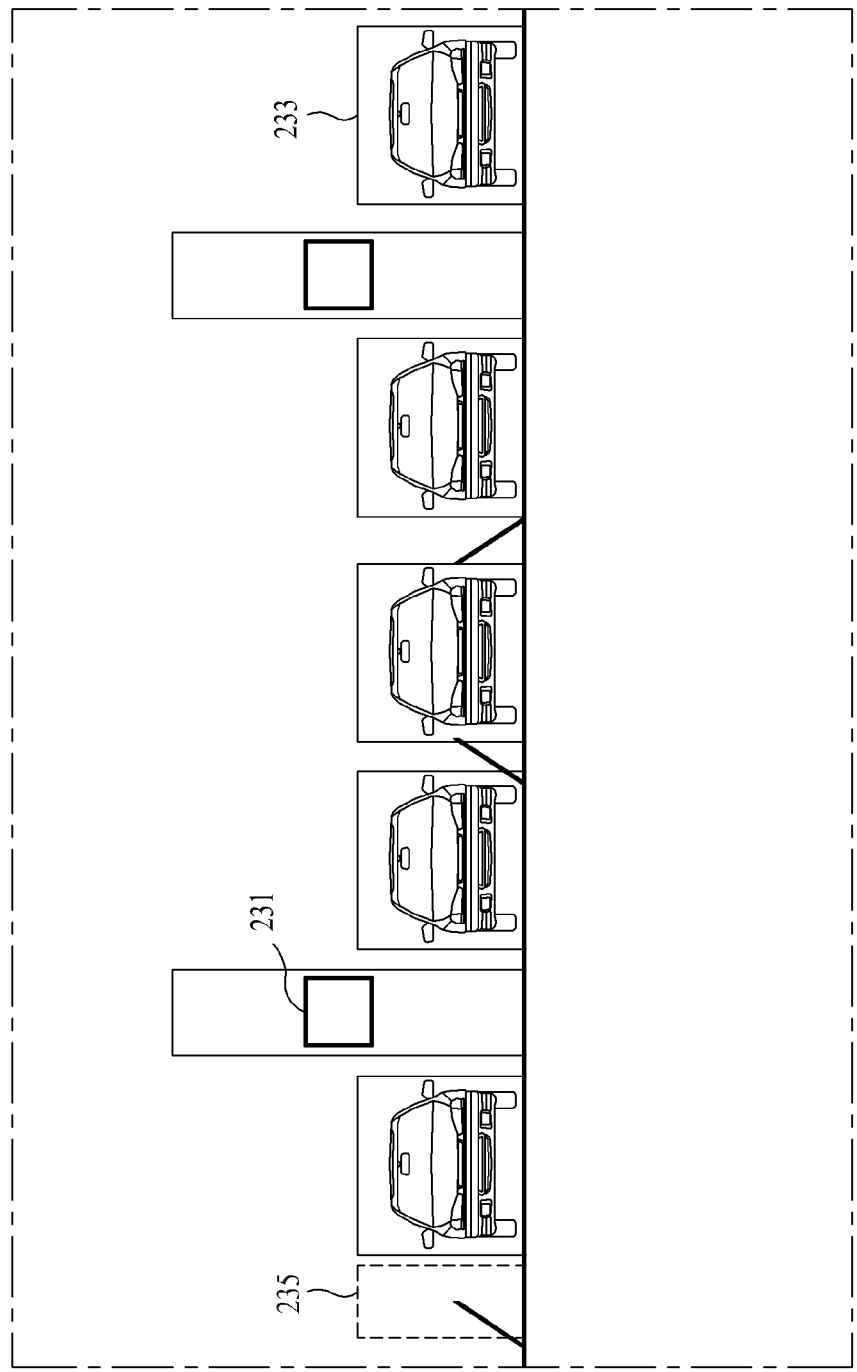
FIG. 2B illustrates a system according to example embodiments.

According to some example embodiments, in operation 221, the server 220 may determine that a location corresponding to the location information is a parking lot. Here, the server 220 may determine location information associated with an object 231 of FIG. 2B based on the object information received from the first electronic device 210. in modified examples, the first electronic device 210 may directly determine a location based on global positioning system (GPS) information and may transmit the determined location to the server 220, such that the server 220 may determine the location of the first electronic device 210 as a parking lot. In this case, although not illustrated, the server 220 may request the first electronic device 210 to monitor the parking lot. In response thereto, the first electronic device 210 may analyze a video being captured as shown in FIG. 2B and may determine whether a vehicle is present, that is, parked in the parking lot. For example, the first electronic device 210 may detect the vehicle as indicated with a solid line 233 corresponding thereto and may detect an empty parking space as indicated with a dotted line 235 corresponding thereto. The first electronic device 210 may transmit a determination result and time information to the server 220 in real time or periodically. The server 220 may analyze the determination result received from the first electronic device 210 based on the time information and may update current status data about the corresponding parking lot in real time or periodically.

In operation 223, the server 220 may determine the service information to be transmitted to the second electronic device 230 based on the location information. For example, the server 220 may determine, as the service information, information regarding whether a parking space is present in the corresponding parking lot or a parking location or a parking status about a specific vehicle (e.g., a vehicle owned by the user of the second electronic device 230) in the corresponding parking lot. In operation 225, the server 220 may transmit the service information to the second electronic device 230. In operation 227, the second electronic device 230 may provide the service information to the user.

That is, the server 220 may operate as a parking control system through interaction with the first electronic device 210. Accordingly, although a closed-circuit television (CCTV) is absent in the parking lot, the server 220 may secure current status data about the parking lot based on the video being captured through the first electronic device.

Also, the server 220 may operate as a parking fee management system. Therefore, the server 220 may transmit parking fee payment information about the vehicle to the first electronic device 210 or the second electronic device 230 mounted to the vehicle that is parked in the corresponding parking lot, and may request the user for a payment.

Figure 3:
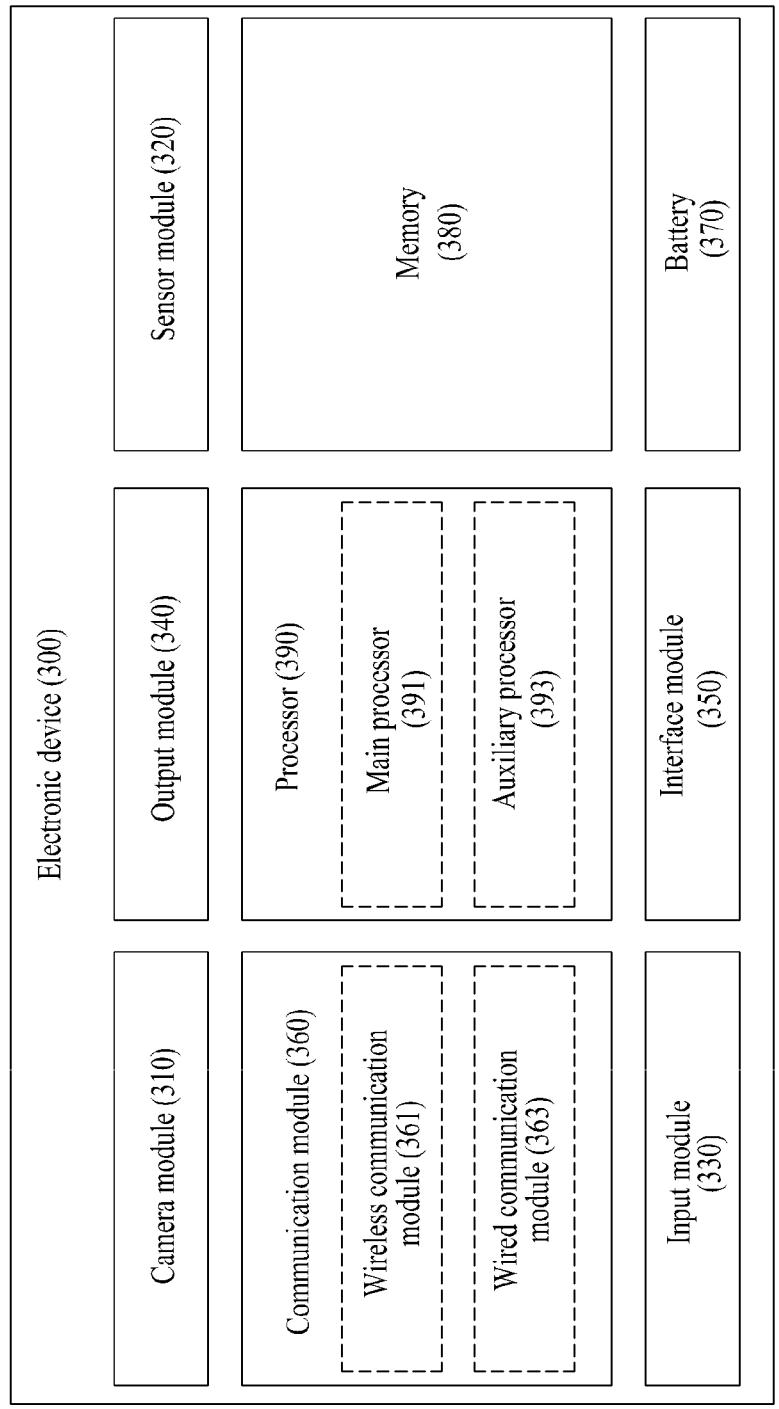
FIG. 3 is a diagram illustrating an electronic device according to example embodiments.

FIG. 3 is a diagram illustrating an electronic device according to example embodiments.

Referring to FIG. 3, an electronic device 300 (e.g., the electronic device 110 of FIG. 1 and the first electronic device 210 of FIG. 2A) may include at least one of a camera module 310, a sensor module 320, an input module 330, an output module 340, an interface module 350, a communication module 360, a battery 370, a memory 380, and a processor 390. In some example embodiments, the electronic device 300 may be mounted to and driven in a vehicle.

The camera module 310 may capture a still image and a moving picture. For example, the camera module 31 may include at least one of at least one lens, an image sensor, an image signal processor, and a flash.

The sensor module 320 may generate an electrical signal or a data value corresponding to an internal operation state (e.g., power or temperature) or an external environmental state of the electronic device 300. For example, the sensor module 320 may include at least one of a gesture sensor, a gyro sensor, a barometric pressure sensor, a magnetic sensor, an acceleration sensor, a grip sensor, a proximity sensor, a color sensor, an infrared (IR) sensor, a biosignal sensor, a temperature sensor, a humidity sensor, and an illumination sensor.

The input module 330 may receive a signal received from an outside. The input module 330 may convert an audio signal to an electrical signal and may input the electrical signal. Alternatively, the input module 330 may receive an instruction or data to be used for the processor 390 from the user and may generate input data. For example, the input module 330 may include at least one of a microphone, a button, a keypad, a keyboard, and a mouse.

The output module 340 may output a play signal to the outside. The output module 340 may convert an electrical signal to an audio signal and may output the audio signal. Alternatively, the output module 340 may visually provide output data. For example, the output module 340 may include at least one of a speaker, a receiver, a display, a hologram device, and a projector, and a control circuit configured to control the same. For example, the display may include a touchscreen display.

The interface module 350 may support a designated protocol capable of connecting the electronic device 300 to an external device in a wired or wireless manner. For example, the interface module 350 may include a connector capable of physically connecting the electronic device 300 to an external device.

The communication module 360 may support communication performance through a communication channel between the electronic device 300 and at least one of a server (e.g., the server 120 of FIG. 1 and the server 220 of FIG. 2A) and another electronic device (e.g., the electronic device 110 of FIG. 1 and the second electronic device 230 of FIG. 2A). The communication module 360 may include at least one of a wireless communication module 361 and a wired communication module 363. For example, the wireless communication module 361 may include at least one of a far distance wireless communication module, a short-range wireless communication module, and a location receiving module. To this end, the wireless communication module 361 may include at least one of at least one antenna and a subscriber identification module in which subscriber identification information is stored, and may transmit or receive a wireless signal through an antenna based on the subscriber identification information. Through this, the communication module 360 may communicate with at least one of the server (e.g., the server 120 of FIG. 1 and the server 220 of FIG. 1) and another electronic device (e.g., the electronic device 110 of FIG. 1 and the second electronic device 230 of FIG. 2A) through at least one of a first network (e.g., the first network 130 of FIG. 1) and a second network (e.g., the second network 140 of FIG. 1).

The battery 370 may supply power to at least one component of the electronic device 300. For example, the battery 370 may include a non-rechargeable primary cell, a rechargeable primary cell, or a fuel cell.

The memory 380 may store a variety of data used by at least one component of the electronic device 300. The memory 380 may store at least one of input data and output with respect to software, such as a program, and an instruction related thereto. The program may include at least one of an operating system (OS), middleware, and an application. For example, the memory 380 may include at least one of a volatile memory and a non-volatile memory.

The processor 390 may control at least one component of the electronic device 300 by driving software and may also perform a variety of data processing and operations. The processor 390 may include at least one of a main processor 391 and an auxiliary processor 393. For example, the main processor 391 may include at least one of a central processing unit (CPU) and an application processor. The auxiliary processor 393 may use low power or may be specified for a designated function compared to the main processor 391, and accordingly, may be operated independently from the main processor 391. For example, the auxiliary processor 393 may include at least one of a graphical processing device, an image signal processor, a sensor hub processor, and a communication processor. According to an example embodiment, when the main processor 391 is in an inactive state, for example, a sleep state, the auxiliary processor 393 may control at least one component of the electronic device 300 instead of the main processor 391. According to another example embodiment, when the main processor 391 is in an active state, the auxiliary processor 393 may control at least one component of the electronic device 300 with the main processor 391. According to another example embodiment, the auxiliary processor 393 may be configured as functionally related another component, for example, a partial component of the camera module 310 or the communication module 360.

Figure 4:
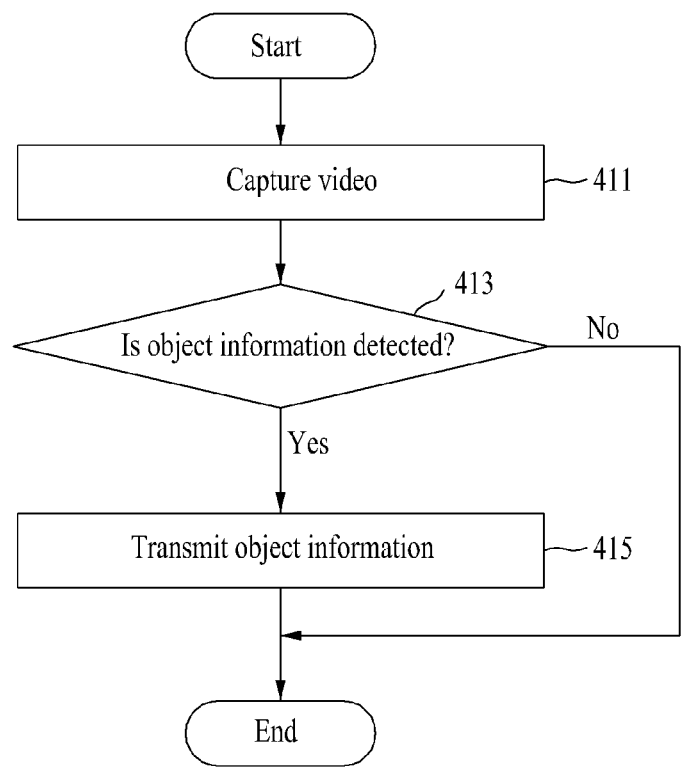
FIG. 4 is a flowchart illustrating an operation method of an electronic device according to example embodiments.

FIG. 4 is a flowchart illustrating an operation method of an electronic device according to example embodiments.

Referring to FIG. 4, in operation 411, the processor 390 may capture a video through the camera module 310. According to an example embodiment, when the first electronic device 210 is ON, the processor 390 may continuously capture a video. For example, when the first electronic device 210 is mounted to a vehicle, the processor 390 may continuously or periodically collect state information associated with the vehicle while continuously capturing the video. The state information may include, for example, at least one of a current location, a refuel amount, a battery state, and an engine oil state of the vehicle. Here, the processor 390 may capture the video regardless of an operation state of the vehicle, for example, whether the vehicle is parked. According to another example embodiment, when the first electronic device 210 is ON, the processor 390 may capture a video temporarily or during a period of time designated by the user in response to a request from the user.

In operation 413, the processor 390 may detect object information from the video being captured using the camera module 310. When the video being captured includes at least one object, the processor 390 may detect object information associated with the object from the video being captured. The object may be formed in various types, and a shape of the object may vary based on a location at which the object is provided. The object may be provided on, for example, a wall surface of a building, a signboard, a display board, a large sticker, or a banner. The type of the object may include at least one of a barcode, a QR code, an image, a text, a color, and a pattern. The object information may include at least one of feature information about at least one feature point recognizable from the object and object identification information about the object.

For example, the processor 390 may analyze the video being captured based on a frame unit. As one example, the processor 390 may analyze all of the frames of the video being captured. As another example, the processor 390 may analyze frames spaced apart at predetermined intervals among all of the frames of the video being captured. Through this, the processor 390 may extract at least one feature point from at least one of continuous frames. The processor 390 may detect the object information based on the feature point. According to an example embodiment, the processor 390 may detect feature information about a feature point. The feature information may include at least one of an attribute of each feature point and a relationship between a plurality of feature points. For example, an attribute of a feature point may include at least one of a size and a color of the feature point, and a relationship between feature points may include at least one of an arrangement structure, an interval, a pattern, and a color combination of the feature points. According to another example embodiment, the processor 390 may detect feature information and object identification information. To this end, the memory 380 may store object information. For example, the object information may be stored in the memory 380 at a time of manufacturing the electronic device 300. As another example, the processor 390 may download object information from the server (e.g., the server 120 of FIG. 1 and the server 220 of FIG. 2A) and may store the object information in the memory 380. As another example, the processor 390 may download object information from the server (e.g., the server 120 of FIG. 1 and the server 220 of FIG. 2A) and may store the object information in the memory 380. Through this, the processor 390 may detect the object identification information from the stored object information based on the detected feature information.

In operation 415, the processor 390 may transmit the object information to the server (e.g., the server 120 of FIG. 1 and the server 220 of FIG. 2A) through the communication module 360. In some example embodiments, when the same object information is iteratively detected a predetermined number of times, the processor 390 may transmit the object information to the server (e.g., the server 120 of FIG. 1 and the server 220 of FIG. 2A). According to an example embodiment, the processor 390 may transmit feature information about a feature point to the server (e.g., the server 120 of FIG. 1 and the server 220 of FIG. 2A). According to another example embodiment, the processor 390 may transmit object identification information to the server (e.g., the server 120 of FIG. 1 and the server 220 of FIG. 2A).

Figure 5:
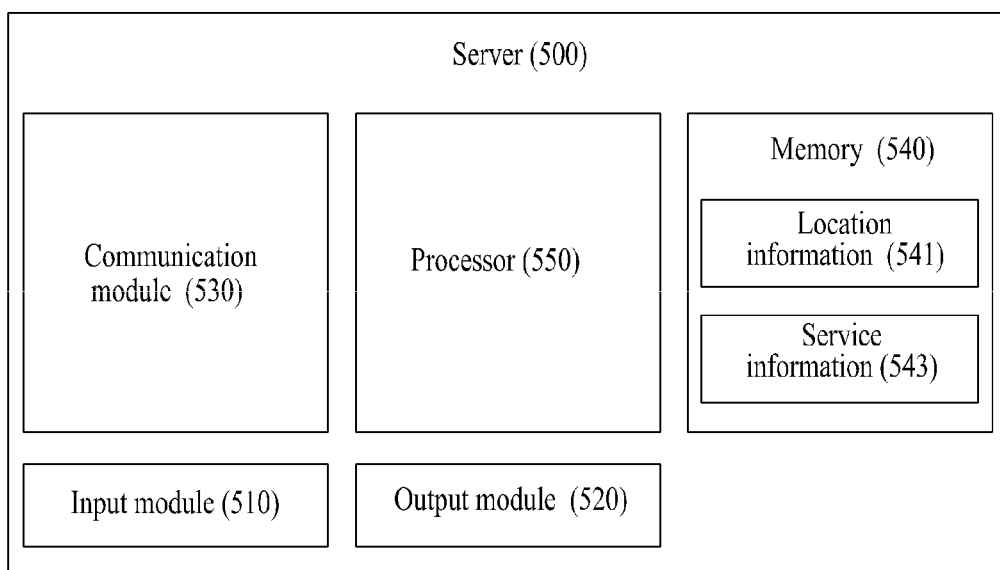
FIG. 5 is a diagram illustrating a server according to example embodiments.

FIG. 5 is a diagram illustrating a server according to example embodiments.

Referring to FIG. 5, a server 500 (e.g., the server 120 of FIG. 1 and the server 220 of FIG. 2A) according to example embodiments may include at least one of an input module 510, an output module 520, a communication module 530, a memory 540, and a processor 550.

The input module 510 may input a signal received from an outside. The input module 510 may convert an audio signal to an electrical signal and may input the electrical signal. Alternatively, the input module 510 may receive an instruction or data to be used for the processor 550 from an operator of the server 500 and may generate input data. For example, the input module 510 may include at least one of a microphone, a button, a keypad, a keyboard, and a mouse.

The output module 520 may output a play signal to the outside. The output module 520 may convert an electrical signal to an audio signal and may output the audio signal. Alternatively, the output module 520 may visually provide output data. For example, the output module 520 may include at least one of a speaker, a receiver, a display, a hologram device, and a projector, and a control circuit to control the same. For example, the display may include a touchscreen.

The communication module 530 may support communication performance through a communication channel between the server 500 and an electronic device (e.g., the electronic device 110 of FIG. 1A, the first electronic device 210 and the second electronic device 230 of FIG. 2A, and the electronic device 300 of FIG. 3A) or another electronic device (e.g., the electronic device 110 of FIG. 1 and the second electronic device 230 of FIG. 2A). The communication module 530 may communicate with the electronic device (e.g., the electronic device 110 of FIG. 1A and the first electronic device 210 and the second electronic device 230 of FIG. 2A) or another electronic device (e.g., the electronic device 110 of FIG. 1 and the second electronic device 230 of FIG. 2A, the electronic device 300 of FIG. 3) through at least one of a first network (e.g., the first network 130 of FIG. 1) and a second network (e.g., the second network 140 of FIG. 1).

The memory 540 may store a variety of data used by at least one component of the server 500. The memory 540 may store at least one of input data and output with respect to software, such as a program, and an instruction related thereto.

The processor 550 may control at least one component of the electronic device 300 by driving software and may also perform a variety of data processing and operations.

Figure 6:
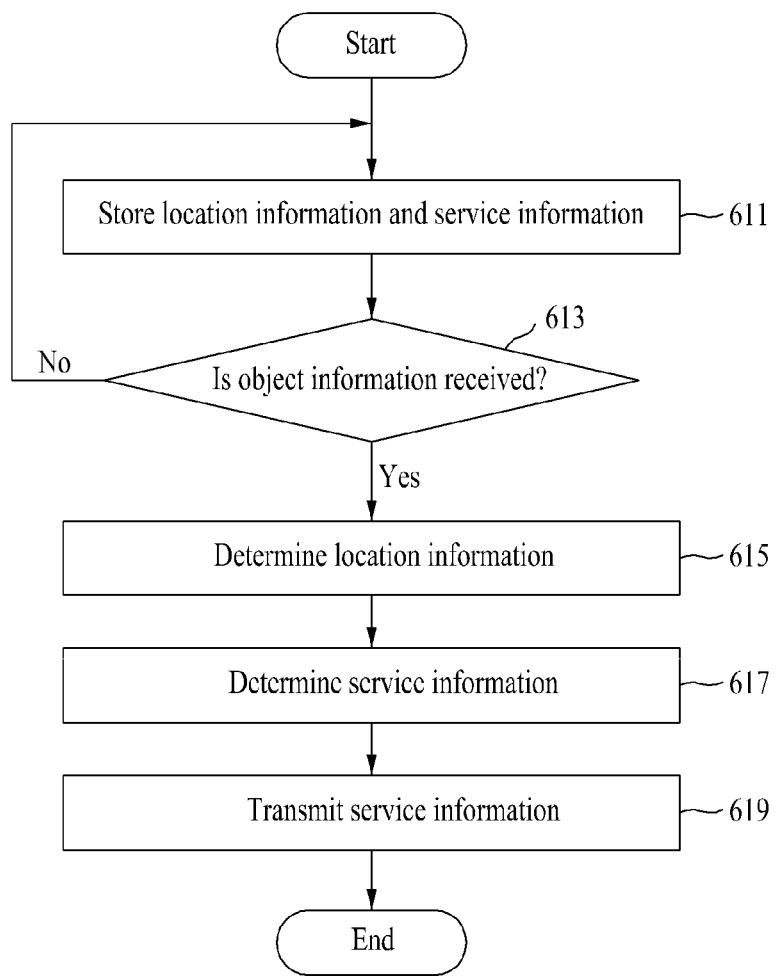
FIG. 6 is a flowchart illustrating an operation method of a server according to example embodiments.

FIG. 6 is a flowchart illustrating an operation method of a server according to example embodiments.

Referring to FIG. 6, in operation 611, the processor 550 may store location information 541 and service information 543 in the memory 540. The location information 541 may represent information associated with at least one location at which at least one object is provided. The object may be formed in various types. A type of the object may vary based on a location at which the object is provided. The object may be provided on a wall surface of a building, a signboard, a display board, a large sticker, or a banner, or may be provided in a hologram form at an entrance of a building. The type of the object may include at least one of a barcode, a QR code, an image, a text, a pattern, and a color. Each object and a corresponding location may be mutually mapped and stored in the location information 541. The location information 541 may include object information about at least one object and location identification information about each location. For example, the object information may include at least one of feature information about at least one feature point recognizable from the object and object identification information about the object. According to an example embodiment, when providing an object at a predetermined location, the processor 550 may store the location information 541 to correspond to the location. The service information 543 may represent information about a service available at one or more locations at which at least one object is provided. For example, the service information 543 may include at least one of guide information about at least one area corresponding to each location, advertising information, event information such as a coupon, payment information, and user related information including a visit frequency, a visit time (e.g., a season, a date, and a point in time), a stay time, contact information, and vehicle information (e.g., a vehicle type, a vehicle model, and a vehicle number). According to example embodiments, the processor 550 may generate and store the service information 543 based on data input from an operator of the server 500, or may define and store the service information 543 through communication with another server (e.g., the server 120 of FIG. 1 and the server 220 of FIG. 2A).

In operation 613, the processor 550 may receive object information from a first electronic device (e.g., the first electronic device 210 of FIG. 2A and the electronic device 300 of FIG. 3) through the communication module 530. For example, the processor 550 may receive at least one of feature information and object identification information from the first electronic device (e.g., the first electronic device 210 of FIG. 2A and the electronic device 300 of FIG. 3). In operation 615, the processor 550 may determine the location information 541 from the memory 540 based on the object information. The processor 550 may identify a location at which the object corresponding to the object information is provided based on the object information. According to an example embodiment, when the feature information is received from the first electronic device (e.g., the first electronic device 210 of FIG. 2A and the electronic device 300 of FIG. 3), the processor 550 may analyze the feature information, may determine object identification information, and may determine the location information 541 based on the object identification information. According to another example embodiment, when the object identification information is received from the first electronic device (e.g., the first electronic device 210 of FIG. 2A and the electronic device 300 of FIG. 3), the processor 550 may determine the location information 541 based on the object identification information. In some example embodiments, the processor 550 may manage statistical data, for example, a number of visits, a preference, and a utilization status of an area corresponding to each location based on a number of times the location information 541 is determined.

Also, the processor 550 may identify a current location in a GPS shadowing area using the location information 541 that is determined based on the object identification information. Through this, the object identification information may be used as a reference point for guiding a route in the GPS shadowing area or in an indoor navigation. For example, indoor data for the indoor navigation may be stored in the first electronic device and the location information 541 may be verified through an object recognition based on the indoor data, which may be used to guide a route or provide a service.

In operation 617, the processor 550 may determine the service information 543 from the memory 540 based on the location information 541. The processor 550 may determine the service information 543 associated with a location corresponding to the location information 541. For example, when a location at which an object is provided corresponds to a department store, a mart, an accommodation, an event location, a festival location, a gas station, a parking lot, car washes, etc., the processor 550 may determine, as the service information 543, at least one of guide information such as map information associated with a location and festival information and event information such as a coupon. As another example, when a location at which an object is provided corresponds to a tollgate, a drive-through, a gas station, a parking lot, car washes, etc., the processor 550 may determine payment information for order or fee as the service information 543.

In an example embodiment, the processor 550 may identify object information based on a location at which an object is provided. For example, when the object is provided at an entrance of a gas station, the object information may include refuel information. When the object is provided at an entrance of a store, the object information may include items on sales and coupon information. Also, a location of each object may be mapped to information that is uniquely allocated to each corresponding object. The processor 550 may determine the service information associated with the location corresponding to the location information.

In another example embodiment, when an object is provided in a maintenance shop or an AP that provides high-speed wireless communication 4G/5G-based cellular or WiFi, object information may include information (software version information, error information, and information regarding whether update is required) used to install or update software of a vehicle to which the first electronic device (e.g., the first electronic device 210 of FIG. 2A and the electronic device 300 of FIG. 3) is mounted, or information used to inspect a safety of the vehicle to which the first electronic device (e.g., the first electronic device 210 of FIG. 2A and the electronic device 300 of FIG. 3) is mounted, for example, information used to diagnose defect of software of the vehicle. In the example embodiments, the processor 550 may verify a location of the vehicle to which a software install, software update, and safety inspection procedure is to be performed based on the location information of the object, and may perform the software install, software update, and safety inspection of the vehicle or the first electronic device (e.g., the first electronic device 210 of FIG. 2A and the electronic device 300 of FIG. 3) through OTA based on the verified location. When the software install, software update, and safety inspection of the vehicle or the first electronic device (e.g., the first electronic device 210 of FIG. 2A and the electronic device 300 of FIG. 3) is performed at a cost, the software 550 may determine, as the service information, payment information regarding the performed software install, software update, and safety inspection with respect to the second electronic device (e.g., the electronic device 110 of FIG. 1 and the second electronic device 230 of FIG. 2A).

In another example embodiment, when an object is provided in a warehouse or a delivery destination of goods, object information may include transportation information, delivery information (delivery completion information, delivery location information, and the like), and the like. The object information may vary depending on whether the second electronic device (e.g., the electronic device 110 of FIG. 1 and the second electronic device 230 of FIG. 2A) is a computer of a logistics management system or an electronic device carried by a recipient. In detail, when the second electronic device (e.g., the electronic device 110 of FIG. 1 and the second electronic device 230 of FIG. 2A) is the computer of the logistics management system, the first electronic device (e.g., the first electronic device 210 of FIG. 2A and the electronic device 300 of FIG. 3) may be mounted to a transportation device, for example, a truck, which delivers the goods. In this case, the object information may include information regarding an arrival of the goods to a destination of the goods, which is to be transmitted to the processor 550 of a logistics system. The service information to be transmitted from the processor 550 to the second electronic device (e.g., the electronic device 110 of FIG. 1 and the second electronic device 230 of FIG. 2A) in operation 225 of FIG. 2A may include payment information about a transportation fee to be charged to the recipient that receives the corresponding goods, payment information about a shipping charge to be paid to the first electronic device (e.g., the first electronic device 210 of FIG. 2A and the electronic device 300 of FIG. 3) mounted to the transportation device that delivers the corresponding goods to a location of the object, or logistics information to be notified to an operation server of the transportation device. On the contrary, when the second electronic device (e.g., the electronic device 110 of FIG. 1 and the second electronic device 230 of FIG. 2A) is the electronic device of the recipient, the service information to be transmitted from the processor 550 to the second electronic device (e.g., the electronic device 110 of FIG. 1 and the second electronic device 230 of FIG. 2A) may include payment information about a transportation fee, an arrival completion, of the goods, and an arrival time of the goods.

In operation 619, the processor 550 may transmit the service information 543 to the second electronic device (e.g., the electronic device 110 of FIG. 1 and the second electronic device 230 of FIG. 2A) through the communication module 530. The processor 550 may detect the second electronic device (e.g., the electronic device 110 of FIG. 1 and the second electronic device 230 of FIG. 2A) set to correspond to the first electronic device (e.g., the electronic device 110 of FIG. 1, the first electronic device 210 of FIG. 2A, and the electronic device 300 of FIG. 3), and may transmit the service information to the second electronic device (e.g., the electronic device 110 of FIG. 1 and the second electronic device 230 of FIG. 2A). In some example embodiments, the processor 550 may transmit the service information 543 to another server (e.g., the server 120 of FIG. 1). For example, the processor 550 may allow another server (e.g., the server 120 of FIG. 1) to transmit the service information 543 to the second electronic device (e.g., the electronic device 110 of FIG. 1 and the second electronic device 230 of FIG. 2A). As another example, when the service information 543 includes payment information, the processor 550 may transmit the service information 543 to another server (e.g., the server 120 of FIG. 1), such as the payment server, to enable a payment of the user. Through this, the server (e.g., the server 120 of FIG. 1 and the server 220 of FIG. 2A) may conduct a business for selling goods or providing services for a specific company under contract with the corresponding company and may earn revenues from the business.

According to some example embodiments, in operation 615, the processor 550 may determine that a location corresponding to the location information is a parking lot. Here, the processor 550 may determine the location information associated with the object 231 based on the object information received from the first electronic device (e.g., the first electronic device 210 of FIG. 2A and the electronic device 300 of FIG. 3). In this case, although not illustrated, the processor 550 may request the first electronic device (e.g., the first electronic device 210 of FIG. 2A and the electronic device 300 of FIG. 3) to monitor the parking lot. In response thereto, the first electronic device (e.g., the first electronic device 210 of FIG. 2A and the electronic device 300 of FIG. 3) may analyze a video being captured as shown in FIG. 2B and may determine whether the vehicle is present, that is, parked in the parking lot. For example, the processor 550 may detect the vehicle as indicated with the solid line 233 corresponding thereto and may detect an empty parking space as indicated with the dotted line 235 corresponding thereto. The first electronic device (e.g., the first electronic device 210 of FIG. 2A and the electronic device 300 of FIG. 3) may transmit a determination result and time information to the server (e.g., the server 120 of FIG. 1 and the server 220 of FIG. 2A) in real time or periodically. The processor 550 may analyze the determination result received from the first electronic device (e.g., the first electronic device 210 of FIG. 2A and the electronic device 300 of FIG. 3) based on the time information and may update current status data about the corresponding parking lot in real time or periodically.

In operation 617, the processor 550 may determine the service information to be transmitted to the second electronic device 230 based on the location information. For example, the processor 550 may determine, as the service information, information regarding whether a parking space is present in the corresponding parking lot or a parking location or a parking status about a specific vehicle in the corresponding parking lot. In operation 619, the processor 550 may transmit the service information to the second electronic device (e.g., the electronic device 110 of FIG. 1 and the second electronic device 230 of FIG. 2A).

That is, the server (e.g., the server 120 of FIG. 1 and the server 220 of FIG. 2A) may operate as a parking control system through interaction with the first electronic device (e.g., the first electronic device 210 of FIG. 2A and the electronic device 300 of FIG. 3). Accordingly, although a CCTV is absent in the parking lot, the server (e.g., the server 120 of FIG. 1 and the server 220 of FIG. 2A) may secure current status data about the parking lot based on the video being captured through the first electronic device 210.

Figure 7:
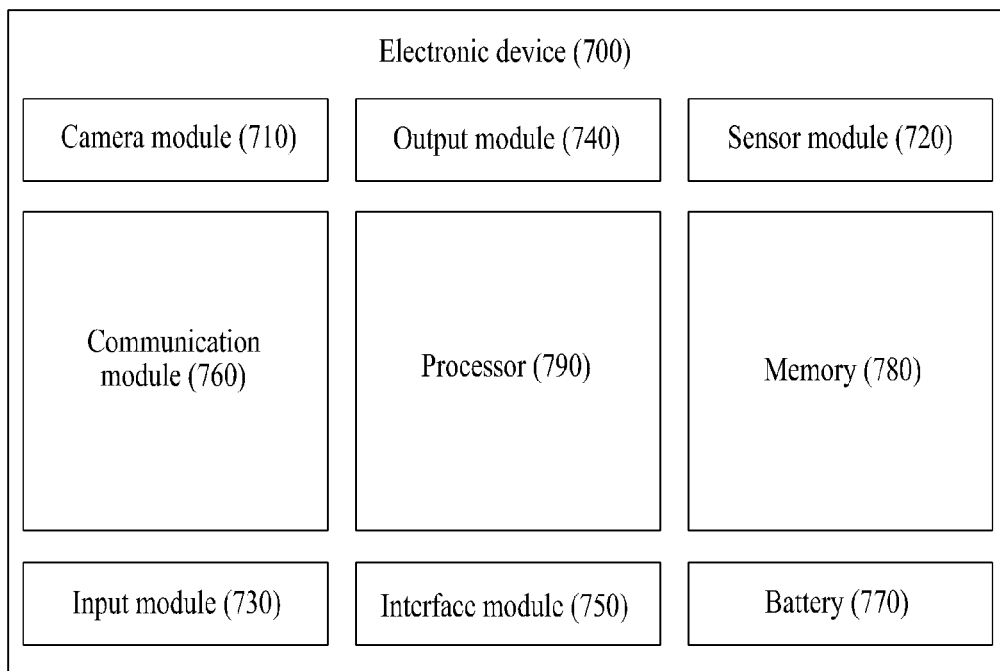
FIG. 7 is a diagram illustrating an electronic device according to example embodiments.

FIG. 7 is a diagram illustrating an electronic device according to example embodiments.

Referring to FIG. 7, an electronic device 700 (e.g., the electronic device 110 of FIG. 1 and the second electronic device 230 of FIG. 2A) according to example embodiments may include at least one of a camera module 710, a sensor module 720, an input module 730, an output module 740, an interface module 750, a communication module 760, a battery 770, a memory 780, and a processor 790. Here, components of the electronic device 700 may be identical to or similar to those of the electronic device 300. Further description related thereto is omitted here.

Figure 8:
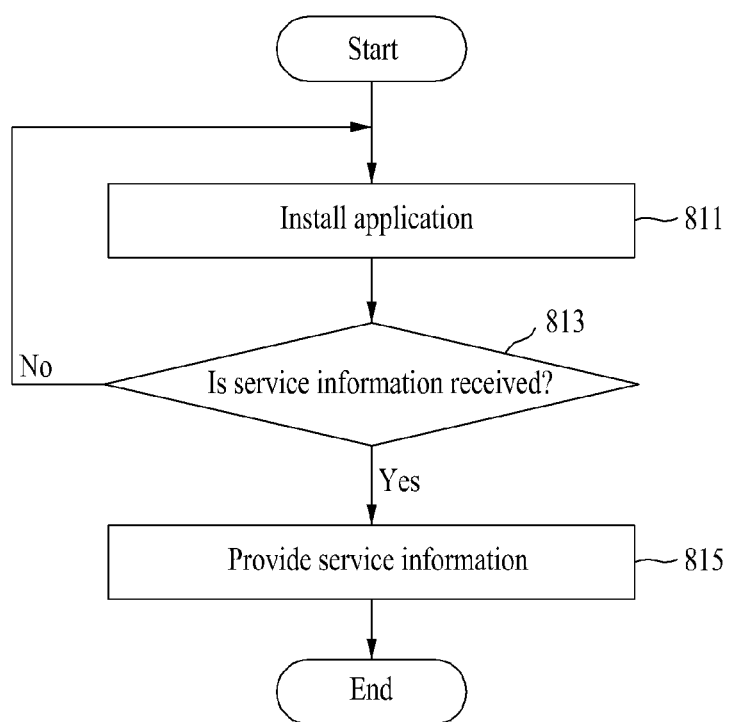
FIG. 8 is a flowchart illustrating an operation method of an electronic device according to example embodiments.
Figure 9A:
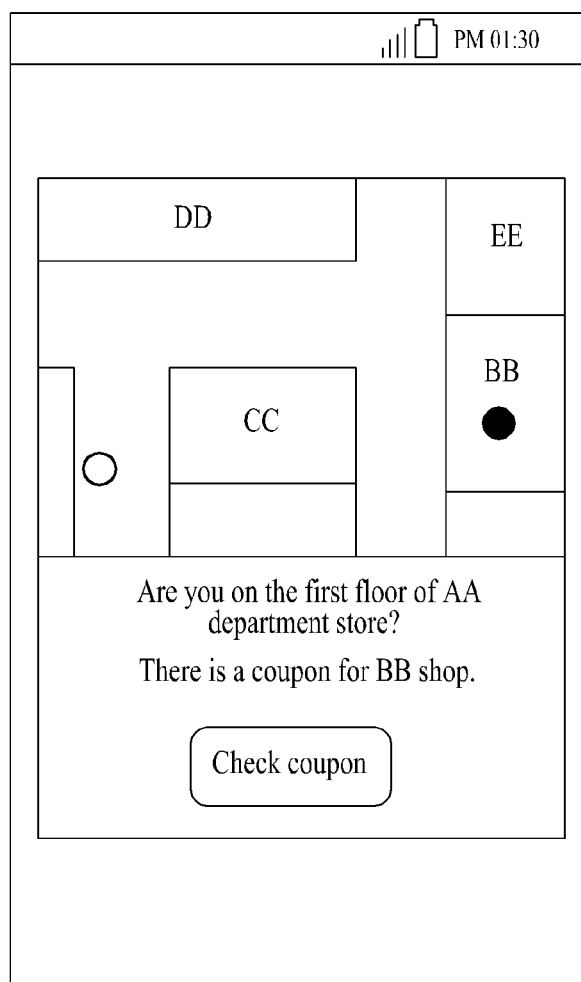
FIGS. 9A, 9B, and 9C illustrate examples of a screen displayed to provide service information of FIG. 8.
Figure 9B:
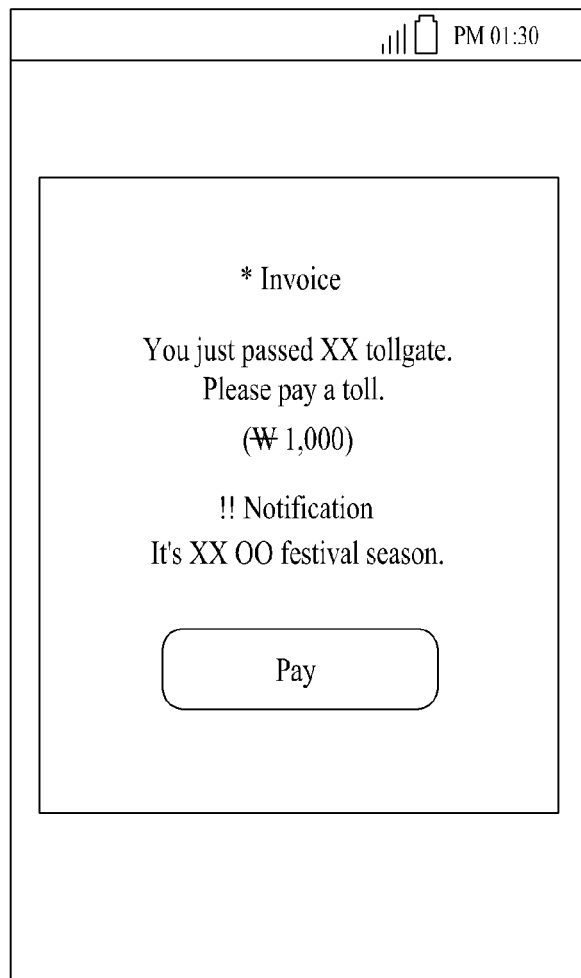
Figure 9C:
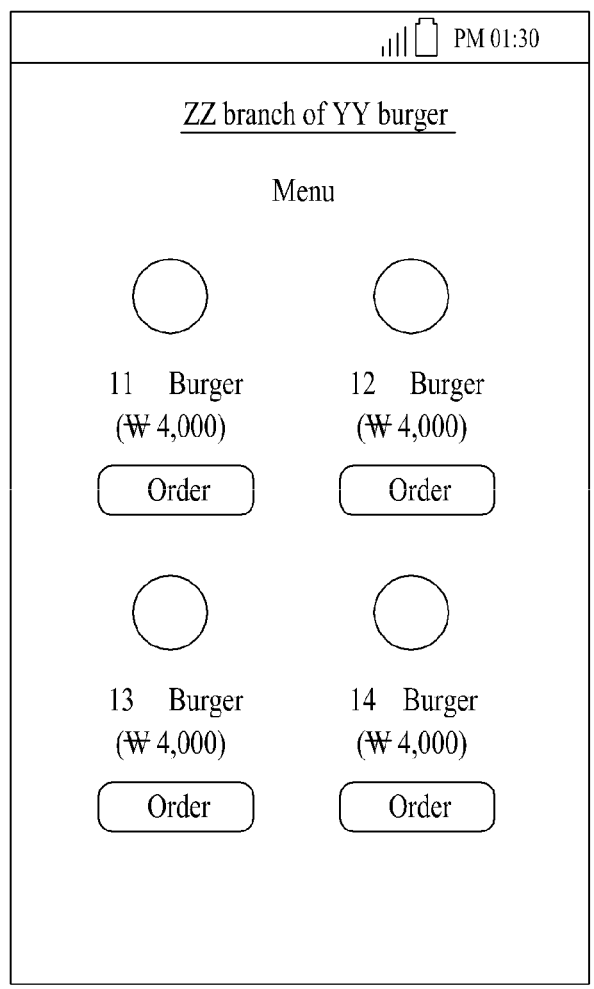

FIG. 8 is a flowchart illustrating an operation method of an electronic device according to example embodiments, and FIGS. 9A, 9B, and 9C illustrate examples of a screen displayed to provide service information of FIG. 8.

Referring to FIG. 8, in operation 811, a predetermined application may be installed in the electronic device 700 (e.g., the electronic device 110 of FIG. 1 and the second electronic device 230 of FIG. 2A). For example, the application may be an application associated with a location-based service. To this end, the processor 790 may download and install the application from an application store through the communication module 760.

In operation 813, the processor 790 may receive service information from a server (e.g., the server 120 of FIG. 1, the server 220 of FIG. 2A, and the server 500 of FIG. 5) through the communication module 760. The service information may represent information associated with a service available at a specific location, for example, a user location. For example, the service information may include at least one of guide information about at least one area corresponding to each location, advertising information, event information such as a coupon, and payment information. The service information may be determined by the server (e.g., the server 120 of FIG. 1, the server 220 of FIG. 2A, and the server 500 of FIG. 5) based on at least one object provided at a specific location, for example, a user location. The object may be formed in various types, and a type of the object may vary based on a location at which the object is provided. The object may be provided on a wall surface of a building, a signboard, a display board, a large sticker, or a banner. The type of the object may include at least one of a barcode, a QR code, an image, a text, a pattern, and a color.

For example, when a location at which an object is provided corresponds to a department store, a mart, an accommodation, an event location, a festival location, a gas station, a parking lot, car washes, etc., the service information may include at least one of guide information such as map information associated with a location and festival information and event information such as a coupon.

As another example, when a location at which an object is provided corresponds to a tollgate, a drive-through, a gas station, a parking lot, car washes, etc., the service information may include payment information for order or fee.

As another example, when an object is provided in a maintenance shop or an AP that provides high-speed wireless communication 4G/5G-based cellular or WiFi, the service information may include payment information about a software install, software update, and safety inspection performed with respect to another electronic device (e.g., the first electronic device 210 of FIG. 2A and the electronic device 300 of FIG. 3) or a vehicle to which the other electronic device (e.g., the first electronic device 210 of FIG. 2A and the electronic device 300) is mounted.

As another example, when an object is provided in a warehouse or a delivery destination of goods, the service information may vary depending on whether the electronic device 700 is a computer of a logistics management system or an electronic device carried by a recipient. In detail, when the electronic device 700 is the computer of the logistics management system, the service information may include payment information about a transportation fee to be charged to the recipient that receives the corresponding goods, payment information about a shipping charge to be paid to another electronic device (e.g., the first electronic device 210 of FIG. 2A and the electronic device 300 of FIG. 3) mounted to the transportation device that delivers the corresponding goods to a location of the object, or logistics information to be notified to an operation server of the transportation device. On the contrary, when the electronic device 700 is the electronic device of the recipient, the service information may include payment information about a transportation fee, an arrival completion of the goods, and an arrival time of the goods.

In operation 815, the processor 790 may provide the service information to the user. According to an example embodiment, the processor 790 may provide the service information through a predetermined application. According to another example embodiment, when the service information is received from the server (e.g., the server 120 of FIG. 1, the server 220 of FIG. 2A, and the server 500 of FIG. 5), the processor 790 may generate a notification associated with the service information and may provide the service information through the application in response to a request from the user. In some example embodiments, the processor 790 may provide the service information through interaction with the server (e.g., the server 120 of FIG. 1, the server 220 of FIG. 2A, and the server 500 of FIG. 5) or another server (e.g., the server 120 of FIG. 1 and the server 220 of FIG. 2A) such as a payment server through the communication module 760.

For example, the processor 790 may provide the service information using at least one of a text, an image, a map, and a voice. Referring to FIGS. 9A, 9B, and 9C, the processor 790 may display a GUI associated with the service information. For example, referring to FIG. 9A, when an object is provided in AA department store, the processor 790 may provide, as the service information, guide information such as map information floor by floor and event information such as a coupon in the AA department store. As another example, referring to FIG. 9B, when the object is provided in a tollgate of XX area, the processor 790 may provide, as the service information, payment information used to charge a toll and to guide a toll payment with respect to the tollgate of XX area and guide information such as festival information of XX area. As another example, referring to FIG. 9C, when the object is provided in a drive-through of ZZ branch of YY burger, the processor 790 may provide, as the service information, payment information for guiding order and payment of a desired menu. Referring to FIGS. 9B and 9C, when the service information includes the payment information, the processor 790 may perform an electronic payment through interaction with the server (e.g., the server 120 of FIG. 1, the server 220 of FIG. 2A, and the server 500 of FIG. 5) or another server (e.g., the server 120 of FIG. 1 and the server 220 of FIG. 2A)

According to example embodiments, without a user input to an electronic device (e.g., the electronic device 110 of FIG. 1, the first electronic device 210 of FIG. 2A, and the electronic device 300 of FIG. 3), the server (e.g., the server 120 of FIG. 1, the server 220 of FIG. 2A, and the server 500 of FIG. 5) may provide an appropriate location-based service for the user. That is, based on an object that is detected from a video being captured using the electronic device (e.g., the electronic device 110 of FIG. 1, the first electronic device 210 of FIG. 2A, and the electronic device 300 of FIG. 3), the server (e.g., the server 120 of FIG. 1, the server 220 of FIG. 2A, and the server 500 of FIG. 5) may verify the user location. Accordingly, the electronic device (e.g., the electronic device 110 of FIG. 1, the first electronic device 210 of FIG. 2A, and the electronic device 300 of FIG. 3) does not require a separate input from the user. Since the server (e.g., the server 120 of FIG. 1, the server 220 of FIG. 2A, and the server 500 of FIG. 5) determines the service information based on the user location, the user may use appropriate service information to fit a time and a place corresponding to a current location. Therefore, the user may efficiently use the location-based service.

Figure 10:
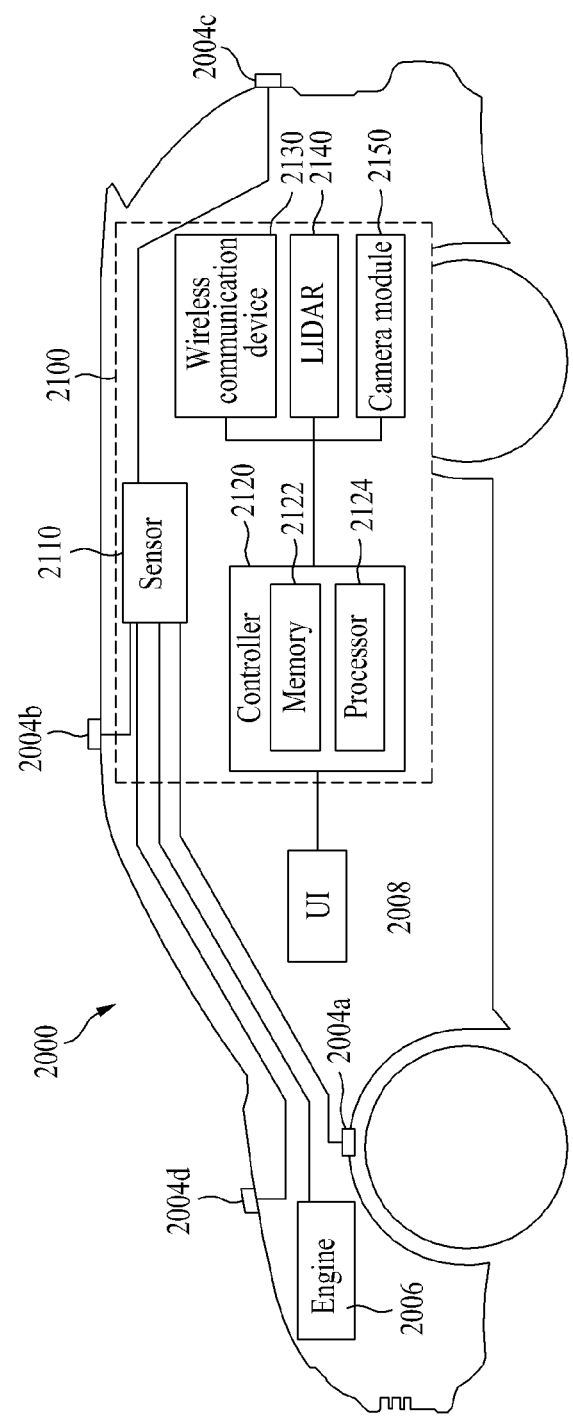
FIG. 10 illustrates an example of a vehicle to which an electronic device is mounted according to example embodiments.
Figure 11:
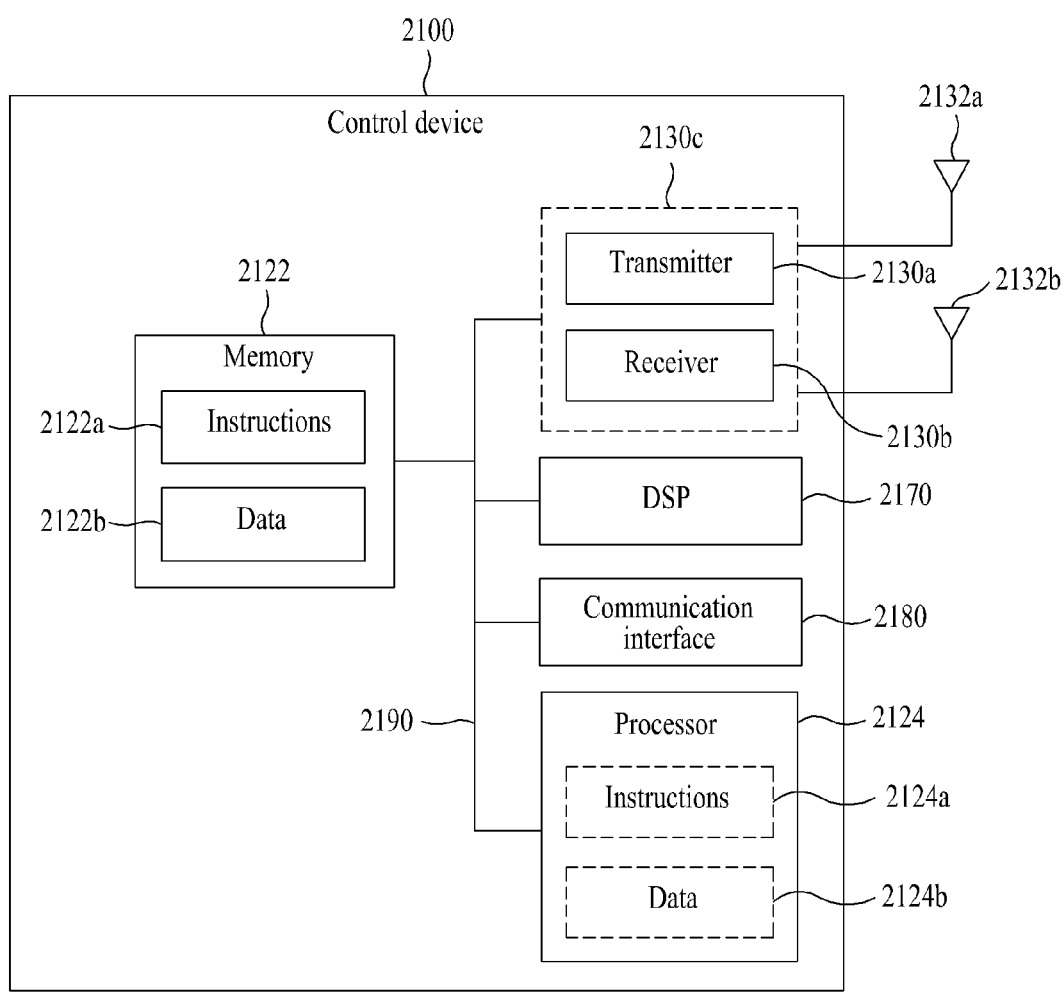
FIG. 11 is a diagram illustrating the electronic device of FIG. 10.

FIG. 10 illustrates an example of a vehicle to which an electronic device is mounted according to example embodiments, and FIG. 11 is a diagram illustrating the electronic device of FIG. 10.

Referring to FIGS. 10 and 11, a control device 2100 (e.g., the electronic device 110 of FIG. 1, the first electronic device 210 and the second electronic device 230 of FIG. 2A, the electronic device 300 of FIG. 3, and the electronic device 700 of FIG. 700) according to example embodiments may be mounted to a vehicle. Here, the vehicle may be an autonomous vehicle 2000.

In the example embodiments, the control device 2100 may include a controller 2120 that includes a memory 2122 (e.g., the memory 380 of FIG. 3 and the memory 780 of FIG. 7), a processor 2124 (e.g., the processor 390 of FIG. 3 and the processor 790 of FIG. 7), a sensor 2110 (e.g., the sensor module 320 of FIG. 3 and the sensor module 720 of FIG. 7), a wireless communication device 2130 (e.g., the communication module 360 of FIG. 3 and the communication module 760 of FIG. 7), a light detection and ranging (LIDAR) device 2140, and a camera module 2150 (e.g., the camera module 310 of FIG. 3 and the camera module 710 of FIG. 7).

In the example embodiments, the controller 2120 may be configured at a time of manufacture by a manufacturing company of the autonomous vehicle 2000 or may be additionally configured to perform an autonomous driving function after manufacture. Alternatively, a configuration to continuously perform an additional function by upgrading the controller 2120 configured at the time of manufacture may be included.

The controller 2120 may forward a control signal to the sensor 2110, an engine 2006, a user interface (UI) 2008, the wireless communication device 2130, the LIDAR device 2140, and the camera module 2150 included as other components in the autonomous vehicle 2000. Although not illustrated, the controller 2120 may forward a control signal to an acceleration device, a braking system, a steering device, or a navigation device associated with driving of the autonomous vehicle 2000.

In the example embodiment, the controller 2120 may control the engine 2006. For example, the controller 2120 may sense a speed limit of a road on which the autonomous vehicle 2000 is driving and may control the engine 2006 such that a driving speed may not exceed the speed limit, or may control the engine 2006 to increase the driving speed of the autonomous vehicle 2000 within the range of not exceeding the speed limit. Additionally, when sensing modules 2004*a*, 2004*b*, 2004*c*, and 2004*d* sense an external environment of the autonomous vehicle 2000 and forward the same to the sensor 2110, the controller 2120 may receive the external environment information, may generate a signal for controlling the engine 2006 or a steering device (not shown), and thereby control driving of the autonomous vehicle 2000.

When another vehicle or an obstacle is present in front of the autonomous vehicle 2000, the controller 2120 may control the engine 2006 or the braking system to decrease the driving speed and may also control a trajectory, a driving route, and a steering angle in addition to the speed. Alternatively, the controller 2120 may generate a necessary control signal based on recognition information of other external environments, such as, for example, a driving lane, a driving signal, etc., of the autonomous vehicle 2000, and may control driving of the autonomous vehicle 2000.

The controller 2120 may also control driving of the autonomous vehicle 2000 by communicating with a peripheral vehicle or a central server in addition to autonomously generating the control signal and by transmitting an instruction for controlling peripheral devices based on the received information.

Further, when a location or an angle of view of the camera module 2150 is changed, it may be difficult for the controller 2120 to accurately recognize a vehicle or a lane. To prevent this, the controller 2120 may generate a control signal for controlling a calibration of the camera module 2150. Therefore, in the example embodiment, the controller 2120 may generate a calibration control signal for the camera module 2150 and may continuously maintain a normal mounting location, direction, angle of view, etc., of the camera module 2150 regardless of a change in the mounting location of the camera module 2150 by a vibration or an impact occurring due to a motion of the autonomous vehicle 2000. When prestored information about an initial mounting location, direction, and angle of view of the camera module 2120 differs from information about the initial mounting location, direction, and angle of view of the camera module 2120 that is measured during driving of the autonomous vehicle 2000 by a threshold or more, the controller 2120 may generate a control signal for the calibration of the camera module 2120.

In the example embodiment, the controller 2120 may include the memory 2122 and the processor 2124. The processor 2124 may execute software stored in the memory 2122 in response to the control signal of the controller 2120. In detail, the controller 2120 may store, in the memory 2122, data and instructions for performing a lane display method or a lane departure warning method, and the instructions may be executed by the processor 2124 to perform at least one method disclosed herein.

Here, the memory 2122 may include a non-volatile recording medium executable at the processor 2124. The memory 2122 may store software and data through an appropriate external device. The memory 2122 may include random access memory (RAM), read only memory (ROM), hard disc, and a memory device connected to a dongle.

The memory 2122 may at least store an operating system (OS), a user application, and executable instructions. The memory 2122 may store application data and arrangement data structures.

The processor 2124 may be a controller, a microcontroller, or a state machine as a microprocessor or an appropriate electronic processor.

The processor 2124 may be configured as a combination of computing apparatuses. The computing apparatus may be configured as a digital signal processor, a microprocessor, or a combination thereof.

Also, in the example embodiment, the control device 2100 may monitor a feature inside and/or outside the autonomous vehicle 2000 and may detect a status of the autonomous vehicle 2000 using at least one sensor 2110.

The sensor 2110 may include at least one sensing module 2004*a*, 2004*b*, 2004*c*, and 2004*d*. The sensing module 2004*a*, 2004*b*, 2004*c*, and 2004*d* may be provided at a specific location of the autonomous vehicle 2000 based on a sensing purpose. The sensing module 2004*a*, 2004*b*, 2004*c*, and 2004*d* may be provided in a lower portion, a rear portion, a front end, an upper end, or a side end of the autonomous vehicle 2000 and may be provided to an internal part of the autonomous vehicle 2000, a tier, and the like.

Through this, the sensing module 2004*a*, 2004*b*, 2004*c*, and 2004*d* may sense driving information, such as the engine 2005, the tier, a steering angle, a speed, a vehicle weight, and the like, as internal vehicle information. Also, the at least one sensing module 2004*a*, 2004*b*, 2004*c*, and 2004*d* may include an acceleration sensor, a gyroscope, an image sensor, a radar, an ultrasound sensor, a LIDAR sensor, and the like, and may sense motion information of the autonomous vehicle 2000.

The sensing module 2004*a*, 2004*b*, 2004*c*, and 2004*d* may receive state information of a road on which the autonomous vehicle 2000 is present, peripheral vehicle information, and feature data about an external environmental state, such as weather, as external information, and may sense a vehicle parameter according thereto. The sensed information may be stored in the memory 2122 temporarily or in long-term depending on purposes.

In the example embodiment, the sensor 2110 may integrate and collect information of the sensing module 2004a, 2004b, 2004c, and 2004d for collecting information occurring inside and outside the autonomous vehicle 2000.

The control device 2100 may further include the wireless communication device 2130.

The wireless communication device 2130 is configured to implement wireless communication between the autonomous vehicles 2000. For example, the wireless communication device 2130 enables the autonomous vehicles 2000 to communicate with a mobile phone of the user, another wireless communication device 2130, another vehicle, a central device (traffic control device), a server, and the like. The wireless communication device 2130 may transmit and receive a wireless signal based on a wireless communication protocol. The wireless communication protocol may be WiFi, Bluetooth, Long-Term Evolution (LTE), code division multiple access (CDMA), wideband code division multiple access (WCDMA), and global systems for mobile communications (GSM). However, it is provided as an example only and the wireless communication protocol is not limited thereto.

Also, in the example embodiment, the autonomous vehicle 2000 may implement vehicle-to-vehicle (V2V) communication through the wireless communication device 2130. That is, the wireless communication device 2130 may perform communication with another vehicle and other vehicles on the roads through the V2V communication. The autonomous vehicle 2000 may transmit and receive information, such as driving warnings and traffic information, through V2V communication and may also request another vehicle for information or may receive a request from the other vehicle. For example, the wireless communication device 2130 may perform the V2V communication using a dedicated short-range communication (DSRC) device or a celluar-V2V (CV2V) device. Also, in addition to the V2V communication, vehicle-to-everything (V2X) communication, for example, communication between a vehicle and an electronic device of a user may be implemented through the wireless communication device 2130.

Also, the control device 2100 may include the LIDAR device 2140. The LIDAR device 2140 may detect an object around the autonomous vehicle 2000 during an operation, based on data sensed using a LIDAR sensor. The LIDAR device 2140 may transmit\detection information to the controller 2120, and the controller 2120 may operate the autonomous vehicle 2000 based on the detection information. For example, when the detection information includes a vehicle ahead driving at a low speed, the controller 2120 may instruct the autonomous vehicle 2000 to decrease a speed through the engine 2006. Alternatively, the controller 2120 may instruct the autonomous vehicle 2000 to decrease a speed based on a curvature of a curve in which the autonomous vehicle 2000 enters.

The control device 2100 may further include the camera module 2150. The controller 2120 may extract object information from an external image captured from the camera module 2150, and may process the extracted object information using the controller 2120.

Also, the control device 2100 may further include imaging devices configured to recognize an external environment. In addition to the LIDAR device 2140, a radar, a GPS device, a driving distance measurement device (odometry), and other computer vision devices may be used. Such devices may selectively or simultaneously operate depending on necessity, thereby enabling a further precise sensing.

The autonomous vehicle 2000 may further include the user interface (UI) 2008 for a user input to the control device 2100. The UI 2008 enables the user to input information through appropriate interaction. For example, the UI 2008 may be configured as a touchscreen, a keypad, and a control button. The UI 2008 may transmit an input or an instruction to the controller 2120, and the controller 2120 may perform a vehicle control operation in response to the input or the instruction.

Also, the UI 2008 may enable communication between an external device of the autonomous vehicle 2000 and the autonomous vehicle 2000 through the wireless communication device 2130. For example, the UI 2008 may enable interaction with a mobile phone, a tablet, or other computer devices.

Further, although the example embodiment describes that the autonomous vehicle 2000 includes the engine 2006, it is provided as an example only. The autonomous vehicle 2000 may include a different type of a propulsion system. For example, the autonomous vehicle 2000 may run with electric energy, hydrogen energy, or through a hybrid system that is a combination thereof. Therefore, the controller 2120 may include a propulsion mechanism according to the propulsion system of the autonomous vehicle 2000 and may provide a control signal according thereto to each component of the propulsion mechanism.

Hereinafter, a configuration of the control device 2100 configured to perform an object information detection and object information guide method according to example embodiments is described with reference to FIG. 11.

The control device 2100 may include the processor 2124. The processor 2124 may be a general-purpose single or multi-chip microprocessor, a dedicated microprocessor, a microcontroller, a programmable gate array, and the like. The processor 2124 may also be referred to as a central processing unit (CPU). Also, in the example embodiment, the processor 2124 may be a combination of a plurality of processors 2124.

The control device 2100 includes the memory 2122. The memory 2122 may be any electronic component capable of storing electronic information. The memory 2122 may include a combination of memories 2122 in addition to a unit memory.

Data 2122b and instructions 2122a for performing the object information detection and object information guide method may be stored in the memory 2122. When the processor 2124 executes the instructions 2122a, the instructions 2122a and a portion or all of the data 2122b required to perform the instructions 2122a may be loaded to the processor 2124 as indicated with dotted lines 2124a and 2124b.

The control device 2100 may include a transceiver 2130c including a transmitter 2130a and a receiver 2130b, to allow transmission and reception of signals. At least one antenna, for example, antennas 2132a and 2132b may be electrically connected to the transceiver 2130c, that is, each of the transmitter 2130a and the receiver 2130b, and may include additional antennas.

The control device 2100 may include a digital signal processor (DSP) 2170, and may control the autonomous vehicle 2000 to quickly process a digital signal through the DSP 2170.

The control device 2100 may also include a communication interface 2180. The communication interface 2180 may include at least one port and/or communication module configured to connect other devices to the control device 2100. The communication interface 2180 may enable interaction between the user and the control device 2100.

Various components of the control device 2100 may be connected through buses 2190, and the one or more buses 2190 may include a power bus, a control signal bus, a state signal bus, and a database bus. The components may forward mutual information through the bus 2190 and may perform a desired function.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device mounted on a vehicle of a first user, the vehicle being in a place including a plurality of parking lots, comprising:
    a camera module configured to capture a video;
    a communication module configured to provide vehicle-to-everything (V2X) communication and wirelessly communicate with a server configured to manage the parking lots; and
    a processor configured to connect to the camera module and the communication module,
    wherein the processor is configured to detect object information associated with at least one object present in the video being captured, and to transmit, through the communication module, the object information to the server,
    wherein the object information is used for generating service information associated with the parking lots, and
    wherein the processor is further configured to:
        receive a monitoring request for the parking lots from the server through the communication module,
        identify at least one empty parking lot or at least one occupied parking lot from among the parking lots by analyzing the video in response to the monitoring request, and
        transmit information associated with the identified parking lot to the server through the communication module.

2. The electronic device of claim 1, wherein the processor is configured to periodically transmit the information associated with the identified parking lot to the server.

3. The electronic device of claim 2, wherein the information associated with the identified parking lot is used for the server to update current status data about the parking lots.

4. The electronic device of claim 3, wherein the service information includes information associated with an empty parking lot among the parking lots, and
    the service information is transmitted from the server to a user terminal of a second user associated with another vehicle present in the place.

5. The electronic device of claim 1, wherein the service information includes at least one of parking fee information of a parking lot in which the vehicle is parked and operation time information of the parking lots, and
    the service information is transmitted from the server to a user terminal of the first user.

6. The electronic device of claim 1, wherein the processor is configured to collect state information of the vehicle and transmit the state information to the server through the communication module, and
    a location of the vehicle is determined by the server based on at least one of the object information and the state information.

7. The electronic device of claim 6, wherein the location of the vehicle represents a parking lot in which the vehicle is parked among the parking lots.

8. An operation method of an electronic device mounted on a vehicle of a first user, the vehicle being in a place including a plurality of parking lots, the method comprising:
    capturing a video;
    detecting object information associated with at least one object present in the video being captured; and
    wirelessly transmitting the object information to a server configured to manage the parking lots by a communication module of the electronic device configured to provide vehicle-to-everything (V2X) communication,
    wherein the object information is used for generating service information associated with the parking lots, and
    wherein the method further comprises:
        receiving a monitoring request for the parking lots from the server;
        identifying at least one empty parking lot or at least one occupied parking lot from among the parking lots by analyzing the video in response to the monitoring request; and
        transmitting information associated with the identified parking lot to the server.

9. The method of claim 8, wherein the transmitting of the information associated with the identified parking lot comprises periodically transmitting the information associated with the identified parking lot to the server.

10. The method of claim 8, further comprising:
    collecting state information of the vehicle; and
    transmitting the state information to the server,
    wherein a location of the vehicle is determined by the server based on at least one of the object information and the state information.

11. An operation method of a server configured to wirelessly communicate with an electronic device mounted on a vehicle of a first user, the server configured to manage a plurality of parking lots in a place, the vehicle being in the place, and the electronic device including a vehicle-to-everything (V2X) communication module configured to wirelessly communicate with the server, the method comprising:
    receiving object information associated with at least one object from an electronic device, the object information having been generated based on a video captured by a camera of the electronic device mounted on the vehicle;
    generating service information associated with the parking lots based on the object information,
    wherein the method further comprises:
        transmitting a monitoring request for the parking lots to the electronic device; and
        receiving, from the electronic device, parking lot identification information for identifying at least one empty parking lot or at least one occupied parking lot from among the parking lots, and wherein the parking lot identification information is generated by analyzing, by the electronic device, the video in response to the monitoring request.

12. The method of claim 11, wherein the receiving of the parking lot identification information comprises periodically receiving the parking lot identification information.

13. The method of claim 12, further comprising:
updating current status data about the parking lots based on the received parking lot identification information.

14. The method of claim 13, wherein the service information includes information associated with an empty parking lot among the parking lots, and
the service information is transmitted from the server to a user terminal of a second user associated with another vehicle present in the place.

15. The method of claim 11, wherein the service information includes at least one of parking fee information of a parking lot in which the vehicle is parked and operation time information of the parking lots, and
the method further comprises:
transmitting the service information to a user terminal of the first user.

16. The method of claim 11, further comprising:
receiving state information of the vehicle collected by the electronic device; and
determining a location of the vehicle based on at least one of the object information and the state information.

* * * * *